United States Patent Office 2,900,302
Patented Aug. 18, 1959

2,900,302
RODENTICIDE

John T. Correll, Kalamazoo, Mich., assignor to The Upjohn Company, Kalamazoo, Mich., a corporation of Michigan No Drawing. Application February 27, 1956
Serial No. 567,733

6 Claims. (Cl. 167—46)

This invention relates to a pesticidal, and more particularly, to a rodenticidal composition and to a method for its administration. This application is a continuation-in-part of my earlier copending application Serial No. 419,585, filed March 29, 1954, now abandoned.

United States Patent No. 2,672,483, issued March 16, 1954, relates to 2-diphenylacetyl-1,3-indandione and salts thereof with a non-toxic metal. Processes for the preparation of those compounds are fully disclosed therein. 2-diphenylacetyl-1,3-indandione is a pale yellow crystalline compound which melts at 146–147 degrees centigrade. It reacts with bases, illustratively sodium or potassium hydroxide, to form salts. 2-diphenylacetyl-1,3-indandione can be prepared by the condensation of a dialkylphthalate and diphenylacetone in an inert solvent in the presence of an alkali-metal alkoxide.

In the present invention it has been discovered that when admixed with a food product as an edible carrier, these compounds are ingested voluntarily by rats in sufficient quantities to cause death from spontaneous hemorrhage. Moreover, it has now been discovered that even after repeated exposure, the rat does not become "bait shy," as is the case with many materials which are toxic to rodents, and that the ingestion of only a few milligrams is fatal to a rodent.

It is an object of this invention to provide compositions which are potent rodenticides. Other objects of the invention will be apparent to one skilled in the art to which the invention pertains.

The foregoing and additional objects have been accomplished by the provision of a composition comprising a food product as an edible carrier and as a toxic ingredient an effective concentration of a compound selected from the group consisting of 2-diphenylacetyl-1,3-indandione and salts thereof.

The essential active ingredient of the composition of the present invention can be represented by the following formula:

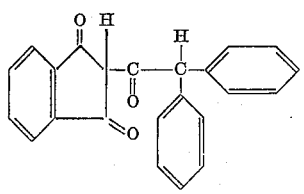

The active ingredients of the composition of the present invention can be combined with any of the foods or baits normally ingested by rodents, such as grain, meat and cheese. Actual experiments on rodents have shown that the active ingredient of the composition is markedly effective at concentrations of from 0.0005 or even less up to 0.1 percent by weight. Concentrations above 0.1 percent are uneconomical, while concentrations of about 0.0005 percent are effective for most practical purposes. The lower limit of effectiveness is definitely far less than hitherto imagined for rodenticides of this type. In experiments wherein rodents were given access continually to both unpoisoned food and poisoned bait, there was no indication that the animals exercised any diet selection. In preparing the composition of the present invention the active ingredient may be simply admixed in the indicated concentrations with food or bait which is acceptable to rodents.

The active ingredients of the present composition include 2-diphenylacetyl-1,3-indandione and its salts. Illustrative salts include salts with toxic or non-toxic metals, e.g., sodium, potassium, copper, nickel, zinc, iron, manganese, magnesium, and the like. Organic salts such as those formed with ammonium, lower-alkyl amines (e.g. methylamine), lower alkanol amines (e.g. ethanolamine), and the like are also included. These salts can be prepared by conventional chemical procedures. The metal salts are preferred, especially the sodium, potassium and iron salts.

The process of the present invention is carried out by inducing rodents to ingest the composition containing the poison. Thus, the poisoned bait is made as attractive to rodents as possible and is placed in a location to which rodents have continual access.

The following examples are illustrative of the compositions and process of this invention but are not to be construed as limiting.

EXAMPLE 1

The following table represents data from experiments in which the animals had access continually (except in the ones marked with an asterisk) to both unpoisoned and poisoned ground grain diet. In one experiment poisoned meat was offered to one group and poisoned cheese to another; both in the presence of unpoisoned grain. The poisoned meat, cheese and grain baits were all acceptable to the rodents. There was no indication that the animals exercised any diet selection. The poison used in these experiments was 2-diphenylacetyl-1,3-indandione. Gross external bleeding was noted from some animals before death.

Table I

| No. of white rats (300±25 gms. body weight) | Percent active ingredient in diet | No. that died |
| --- | --- | --- |
| 5 | 2 | 1 on 5th day, All by 7th–8th day. |
| 10 | 1 | 2 on 4th day, All by 7th–8th day. |
| 10 | 0.5 | Do. |
| 30 | 0.1 | 3 on 4th day, All by 7th–8th day. |
| 10 | 0.025 | 4 on 5th day, All by 7th–8th day. |
| 5 | * 0.1 | 3 by 4th day, Two lived. |
| 5 | * 0.025 | 3 by 6th day, Two lived. |
| Mice (lab.): | | |
| 5 | 0.5 | 4 on 8th day, All by 10th day. |
| 5 | 0.1 | 4 on 3rd day, All by 6th day. |
| 5 | 0.025 | 4 on 6th day, All by 11th day. |

* Poisoned and unpoisoned diets present ad lib. for 24 hours only, after which the poisoned diet was withdrawn.

EXAMPLE 2

A concentration of 0.025 percent of 2-diphenylacetyl-1,3-indandione in grain was fed for five days to a group of ten albino rats. No other food was available. All ten of the rate died. To another group of 45 albino rats was given the same concentration of active material for the same length of time, but this time in the presence of the unpoisoned, normally acceptable diet of the rats. Forty-three of the rats died indicating the absence of bait shyness.

EXAMPLE 3

Following the procedure of Example 1 the sodium salt of 2-diphenylacetyl-1,3-indandione is combined with grain and is effective at concentrations of 0.0005 and 0.1 percent as a rodenticide.

EXAMPLE 4

Adult male laboratory rats, weighing between 150 and 250 grams were given ad libitum access to water, normal diet, and the test diets containing 2-diphenylacetyl-1,3-indandione. Food consumption was determined daily during the first four days, and on the seventh, eighth, and ninth days. On the seventh day untreated food was removed, and survivors were fed treated baits containing 2-diphenylacetyl-1,3-indandione only until the eleventh day. Survivors, if any, were discarded on the eighteenth day. The column headed "Mg./kg. Eaten" in Table II refers to the milligrams of 2-diphenylacetyl-1,3-indandione eaten per kilogram of rat.

Table II

| Concentration of Active Ingredient | Av. Food Consumption (gm.) | | Mg./kg. Eaten | Percent Mortality | Av. Survival (Days) |
|---|---|---|---|---|---|
| | Treated | Untreated | | | |
| 0.025 | 31.5 | 41.7 | 47.1 | 100 | 10.3 |
| 0.0125 | 31.7 | 78.7 | 20.7 | 100 | 10.7 |
| 0.005 | 34.7 | 34.8 | 10.5 | 100 | 7.1 |
| 0.0025 | 23.0 | 38.5 | 3.7 | 83.3 | 7.0 |
| 0.0005 | 31.7 | 20.3 | 1.0 | 100 | 7.8 |

EXAMPLE 5

Individually caged, adult male laboratory rats were fed five grams of treated bait containing 2-diphenylacetyl-1,3-indandione daily at 4 p.m. for four days. Treated food was removed at 9 a.m. the following day, and ten grams of normal diet (untreated) was offered each animal. On the fifth day, each animal was fed forty grams of treated food, but no untreated food was given on the fifth, sixth, or seventh days. Feeding of five-gram portions was resumed on the eighth, ninth, and tenth days. Survivors were fed regular diets until the eighteenth day. The column headed "Mg./kg. Eaten" in Table III refers to the milligrams of 2-diphenylacetyl-1,3-indandione eaten per kilogram of rat.

Table III

| Concentration of Active Ingredient | Mg./kg. Eaten | Percent Mortality | Av. Survival (Days) |
|---|---|---|---|
| 0.025 | 32.3 | 100 | 6.0 |
| 0.0125 | 20.2 | 100 | 7.3 |
| 0.005 | 8.5 | 100 | 7.0 |
| 0.0025 | 3.2 | 100 | 6.7 |
| 0.0005 | 1.2 | 100 | 8.3 |

Examples 4 and 5 clearly show the effectiveness of 2-diphenylacetyl-1,3-indandione as the essential active ingredient in a food carrier when used at concentrations as low as 0.0005 percent by weight.

EXAMPLE 6

Following the procedure of Example 1 the iron salt of 2-diphenylacetyl-1,3-indandione is combined with grain and is effective at concentrations of 0.0005 percent and less as a rodenticide.

It is to be understood that the invention is not to be limited to the exact details of operation or exact compositions shown and described, as obvious modifications and equivalents will be apparent to one skilled in the art, and the invention is therefore to be limited only by the scope of the appended claims.

I claim:

1. As a rodenticidal composition, a dry food product as an edible carrier and as a toxic ingredient an effective concentration of a compound selected from the group consisting of 2-diphenylacetyl-1,3-indandione and metal, ammonia and amine salts thereof.

2. As a rodenticidal composition, a dry food product as an edible carrier and as a toxic ingredient about 0.0005 percent of a compound selected from the group consisting of 2-diphenylacetyl-1,3-indandione and metal salts thereof.

3. As a rodenticidal composition, a dry food product as an edible carrier and as a toxic ingredient about 0.0005 percent of 2-diphenylacetyl-1,3-indandione.

4. As a rodenticidal composition, a dry food product as an edible carrier and as a toxic ingredient from about 0.0005 percent to 0.1 percent of 2-diphenylacetyl-1,3-indandione.

5. As a rodenticidal composition, a dry food product as an edible carrier and as a toxic ingredient from about 0.0005 percent to 0.1 percent of the sodium salt of 2-diphenylacetyl-1,3-indandione.

6. As a rodenticidal composition, a dry food product as an edible carrier and as a toxic ingredient about 0.0005 percent of the iron salt of 2-diphenylacetyl-1,3-indandione.

References Cited in the file of this patent

UNITED STATES PATENTS

| 2,651,591 | Delmar et al. | Sept. 8, 1953 |
| 2,672,483 | Thomas | Mar. 16, 1954 |
| 2,827,489 | Birkenmeyer et al. | Mar. 18, 1958 |

FOREIGN PATENTS

| 638,303 | Great Britain | June 7, 1950 |

OTHER REFERENCES

Crabtree et al.: Pest Control, July 1953, pages 22, 24.
Soap and Sanitary Chemicals, for Feb. 1, 1950, pages 131, 133, 135 and 147.